United States Patent
Chakhaiyar (10) Patent No.: US 9,654,423 B2
(45) Date of Patent: May 16, 2017

(54) METHOD AND SYSTEM FOR PORT PERFORMANCE RANKING IN MULTI-PROTOCOL SWITCH

(71) Applicant: Wipro Limited, Bangalore (IN)

(72) Inventor: Madhukar Gunjan Chakhaiyar, Gaya (IN)

(73) Assignee: Wipro Limited, Bangalore (IN)

( * ) Notice: Subject to any disclaimer, the term of this patent is extended or adjusted under 35 U.S.C. 154(b) by 527 days.

(21) Appl. No.: 14/197,599

(22) Filed: Mar. 5, 2014

(65) Prior Publication Data

US 2015/0207719 A1 Jul. 23, 2015

(30) Foreign Application Priority Data

Jan. 17, 2014 (IN) .............................. 212/CHE/2014

(51) Int. Cl.
*H04L 12/931* (2013.01)

(52) U.S. Cl.
CPC .......... *H04L 49/602* (2013.01); *H04L 49/356* (2013.01); *H04L 49/50* (2013.01)

(58) Field of Classification Search
None
See application file for complete search history.

(56) References Cited

U.S. PATENT DOCUMENTS

| 6,754,216 | B1 | 6/2004 | Wong et al. | |
|---|---|---|---|---|
| 2005/0108444 | A1 | 5/2005 | Flauaus et al. | |
| 2006/0209677 | A1* | 9/2006 | McGee | H04L 12/44 370/216 |
| 2011/0161626 | A1* | 6/2011 | Mangione-Smith | G06F 15/7825 712/29 |
| 2011/0211442 | A1* | 9/2011 | Cheung | H04Q 3/0087 370/217 |
| 2015/0236895 | A1* | 8/2015 | Kay | H04L 43/045 709/224 |

* cited by examiner

*Primary Examiner* — Hassan Phillips
*Assistant Examiner* — Saba Tsegaye
(74) *Attorney, Agent, or Firm* — LeClair Ryan, a Professional Corporation (57) ABSTRACT

A system and method for port performance ranking in a multi-protocol switch includes monitoring one or more first parameters, the one or more first parameters associated with operating condition of one or more ports of the multi-protocol switch. Each of the one or more first parameters is compared with an associated predefined criterion to determine deviation from the associated predefined criterion. One or more eligible ports is determined from the one or more ports based on non-deviation of each of the one or more first parameters from the associated predefined criterion. For each of the one or more eligible ports, each of one or more second parameters is compared with an associated predefined threshold, the one or more second parameters associated with port traffic statistics. The one or more eligible ports are ranked based on the comparison between each of the second parameters and the associated predefined threshold.

15 Claims, 12 Drawing Sheets

| Ports | Port Connection Interface | Port Status (Online/ Offline) | Total Frame Loss/ Drop Count | Total frame Re-Transmission | Total Frame Transaction Count | Total buffer Utilization | Operating Bandwidth Utilization | Port Performance Ranking Weightage | Port Performance rank |
|---|---|---|---|---|---|---|---|---|---|
| Port-1 | Normal | Online | Under Acceptable Threshold | Beyond Acceptable Threshold | Under Acceptable Threshold | Beyond Acceptable Threshold | Beyond Acceptable Threshold | 7 | 3 |
| Port-2 | Normal | Online | Under Acceptable Threshold | Under Acceptable Threshold | Beyond Acceptable Threshold | Under Acceptable Threshold | Beyond Acceptable Threshold | 8 | 1 |
| Port-3 | Normal | Offline | Beyond Acceptable Threshold | Beyond Acceptable Threshold | Under Acceptable Threshold | Beyond Acceptable Threshold | Under Acceptable Threshold | 0 | NA |
| Port-4 | Error | Online | Under Acceptable Threshold | Under Acceptable Threshold | Beyond Acceptable Threshold | Under Acceptable Threshold | Beyond Acceptable Threshold | 0 | NA |
| Port-5 | Normal | Online | Under Acceptable Threshold | Beyond Acceptable Threshold | Under Acceptable Threshold | Beyond Acceptable Threshold | Under Acceptable Threshold | 8 | 2 |

FIG. 6

METHOD AND SYSTEM FOR PORT PERFORMANCE RANKING IN MULTI-PROTOCOL SWITCH

CROSS-REFERENCE TO RELATED APPLICATIONS

This application claims the benefit of Indian Patent Application Filing No. 212/CHE/2014, filed Jan. 17, 2014, which is hereby incorporated by reference in its entirety.

FIELD OF THE INVENTION

The present disclosure relates generally to multi-protocol switching, and more particularly to a method and a system for port performance ranking in a multi-protocol switching device.

BACKGROUND OF THE INVENTION

With increasing needs for storage of data, storage area networks (SANs) have become a widely accepted solution for storing huge amount of data associated with a network of host devices. In a SAN, a multi-protocol switch connects host devices such as data servers to storage databases in a storage area network. In a multi-protocol SAN scenario, the data servers access different storage databases using the multi-protocol switch for frame retransmission and I/O operations. When multiple applications associated with the data servers try to access a single port associated with a storage database, the port may experience performance degradation due to heavy traffic. The performance degradation is due to the frame drop loss or frame transmission delay due to heavy traffic on the port of the multi-protocol switch. This becomes serious when critical application is operational and trying to perform the I/O operation on the port.

Additionally, in the multi-protocol switch, there is difference in protocol frame speed, bit error rate, frame flow order, frame conversion time that influences the performance of the port.

Further, port load condition, state of infrastructure (different protocols support connection interfaces through which the databases (SAN devices) are connected to the multi-protocol switch) further aggravates port performance of the multi-protocol switch.

In view of the above, it would be desirable to have the multi-protocol switch that ranks ports based on performance of those ports and notifies when the performance of the port changes.

SUMMARY OF THE INVENTION

Disclosed herein is a port performance ranking method performed in a multi-protocol switch, the port performance ranking method includes monitoring one or more first parameters, the one or more first parameters associated with operating condition of one or more ports of the multi-protocol switch, comparing each of the one or more first parameters with an associated predefined criterion to determine deviation from the predefined criterion, determining one or more eligible ports from the one or more ports based on non-deviation of each of the one or more first parameters from the associated predefined criterion, comparing, for each of the one or more eligible ports, each of one or more second parameters with an associated predefined threshold, the one or more second parameters associated with port traffic statistics; and ranking the one or more eligible ports based on the comparison between each of the one or more second parameters and the associated predefined threshold.

In an aspect of the invention, the system for performing port ranking in a multi-protocol switching device includes at least one processor, at least one memory coupled to the at least one processor, the at least one memory storing processor executable instructions which when executed by the at least one processor causes the at least one processor to: monitor one or more first parameters, the one or more first parameters associated with operating condition of one or more ports of the multi-protocol switch, compare each of the one or more first parameters with an associated predefined criterion to determine deviation from the predefined criterion, determine one or more eligible ports from the one or more ports based on non-deviation of each of the one or more first parameters from the associated predefined criterion, compare, for each of the one or more eligible ports, each of one or more second parameters with an associated predefined threshold, the one or more second parameters associated with port traffic statistics, and rank the one or more eligible ports based on the comparison between each of the one or more second parameters and the associated predefined threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE INVENTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
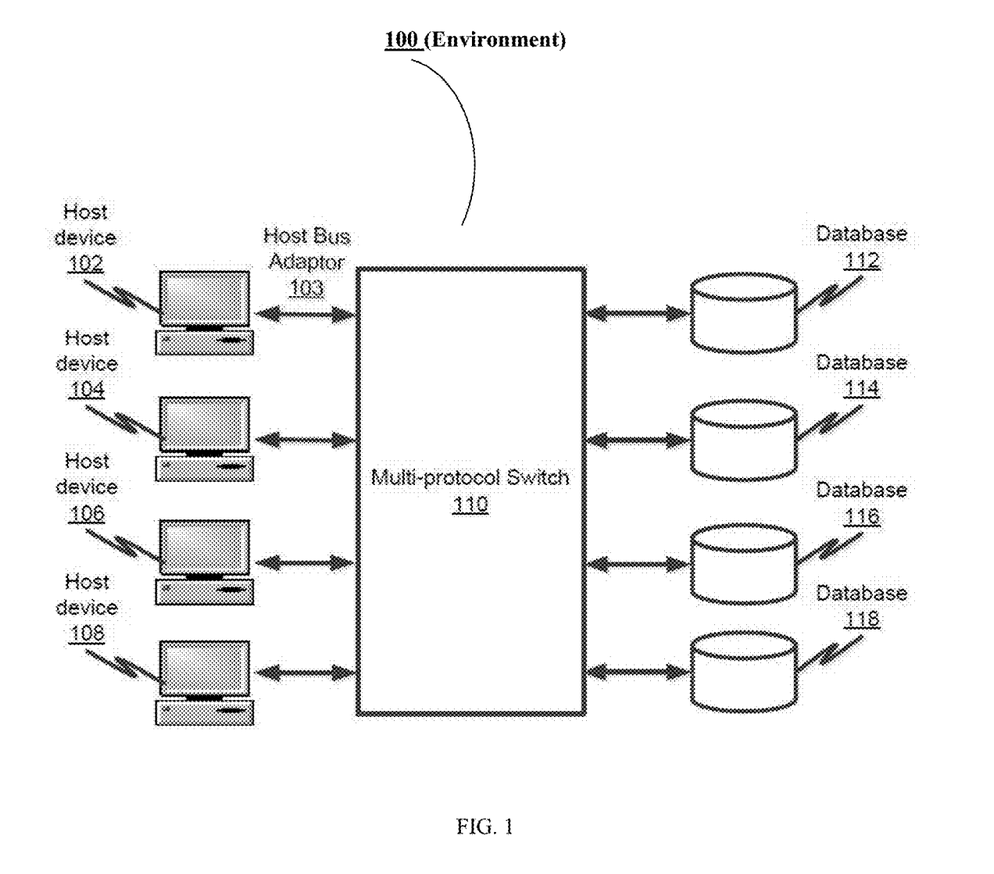
FIG. 1 illustrates an exemplary environment in which various embodiments may function.

FIG. 1 illustrates an exemplary environment 100 in which various embodiments may function. In some embodiments, environment 100 may represent a storage area network (SAN) that includes a host device 102, a host device 104, a host device 106, a host device 108, a switching device 110, a database 112, a database 114, a database 116, and a database 118. It should be apparent to a person skilled in the art that the number of host devices or databases is not limited to the configuration shown in FIG. 1 and any number of host devices or databases that may be required to implement the details of this disclosure may be used. In addition, the number of host devices may not necessarily be equivalent to the number of databases.

Further, one or more of the host devices shown in FIG. 1 may interact with one or more of the database 112, the database 114, the database 116, and the database 118 via a multi-protocol switching device 110. In some embodiments, a host device may include, without limitation, a data server that includes processing and storage capabilities. Such a host device may include, without limitation, a desktop computer, a laptop, a tablet, a mobile device, and a personal digital assistant. Further, a database may include one or more storage devices such as, but not limited to: disk arrays, Redundant Array of Independent Disks (RAID) systems, Just a Bunch Of Disks (JBOD's), optical storage devices, and tape devices.

In some embodiments, host bus adaptors (HBAs), e.g., 103, may be used to connect host devices and databases to the multi-protocol switching device 110. The host devices of FIG. 1 may interact with the databases of FIG. 1 to store data associated with the host devices in the databases. A host device (host device 102, host device 104 etc) may provide data to the multi-protocol switching device 110 in the form of frames that are formatted according to a protocol associated with the host device. The multi-protocol switching device 110 may further provide data to the database (database 114, database 116 etc.) in the form of frames that are formatted according to a protocol associated with the database. A host device associated with one protocol may interact with a database associated with the same or a different protocol as the host device via the multi-protocol switching device 110. Examples of such protocols associated with the host device and/or database include without limitation: Ethernet; InfiniBand; Serial Attached Small Computer System Interface; Internet Small Computer System Interface; and Fibre Channel protocols.

In an exemplary scenario, the host device 102 and the host device 108 may be associated with a fibre channel (FC) protocol. Similarly, the host device 104 may be associated with InfiniBand (IB) protocol, the host device 106 may be associated with Internet Small Computer System Interface (iSCSI) protocol. Further, the database 112 and the database 114 may be associated with an the Ethernet protocol, the database 116 may be associated with the iSCSI protocol, and the database 118 may be associated with IB protocol.

In keeping with this example, each of the host devices may interact with one or more of the databases as illustrated in FIG. 1. The host device 102 may interact with the database 114, the host device 104 may interact with the database 112 and the database 118, the host device 106 may interact with database 116, and the host device 108 may interact with the database 112, the database 114, and the database 118.

It should be apparent to a person skilled in the art, however, that the protocols associated with the host devices or databases are not limited to the protocols discussed in this example and other protocols such as, e.g., Serial Attached Small Computer System Interface (SCSI) protocol and Serial Attached SCSI (SAS) protocol may also be associated with the host devices.

Figure 2:
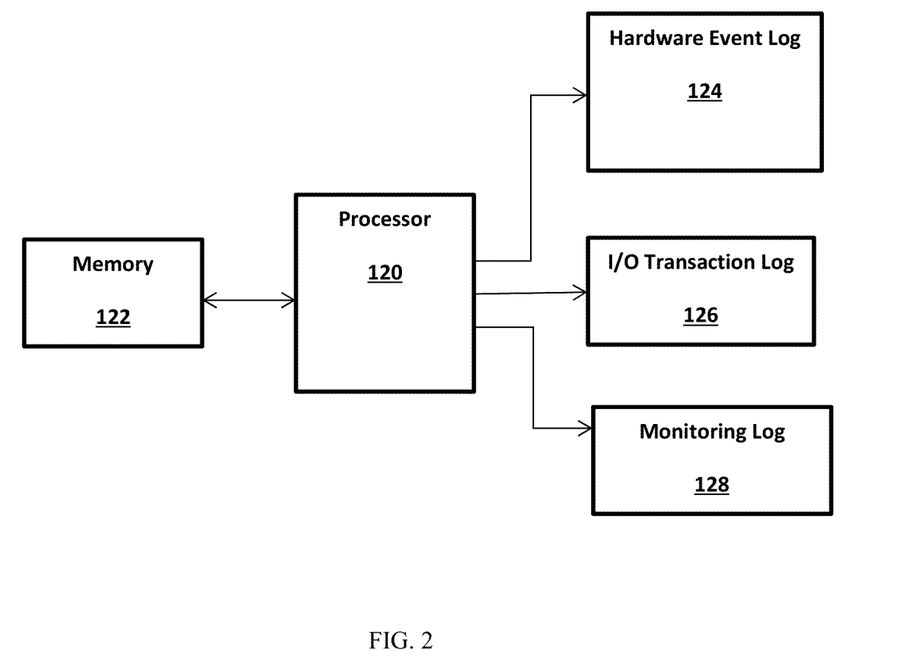
FIG. 2 is a block diagram illustrating process of log collection by a multi-protocol switch in accordance with some embodiments.
Figure 3A:
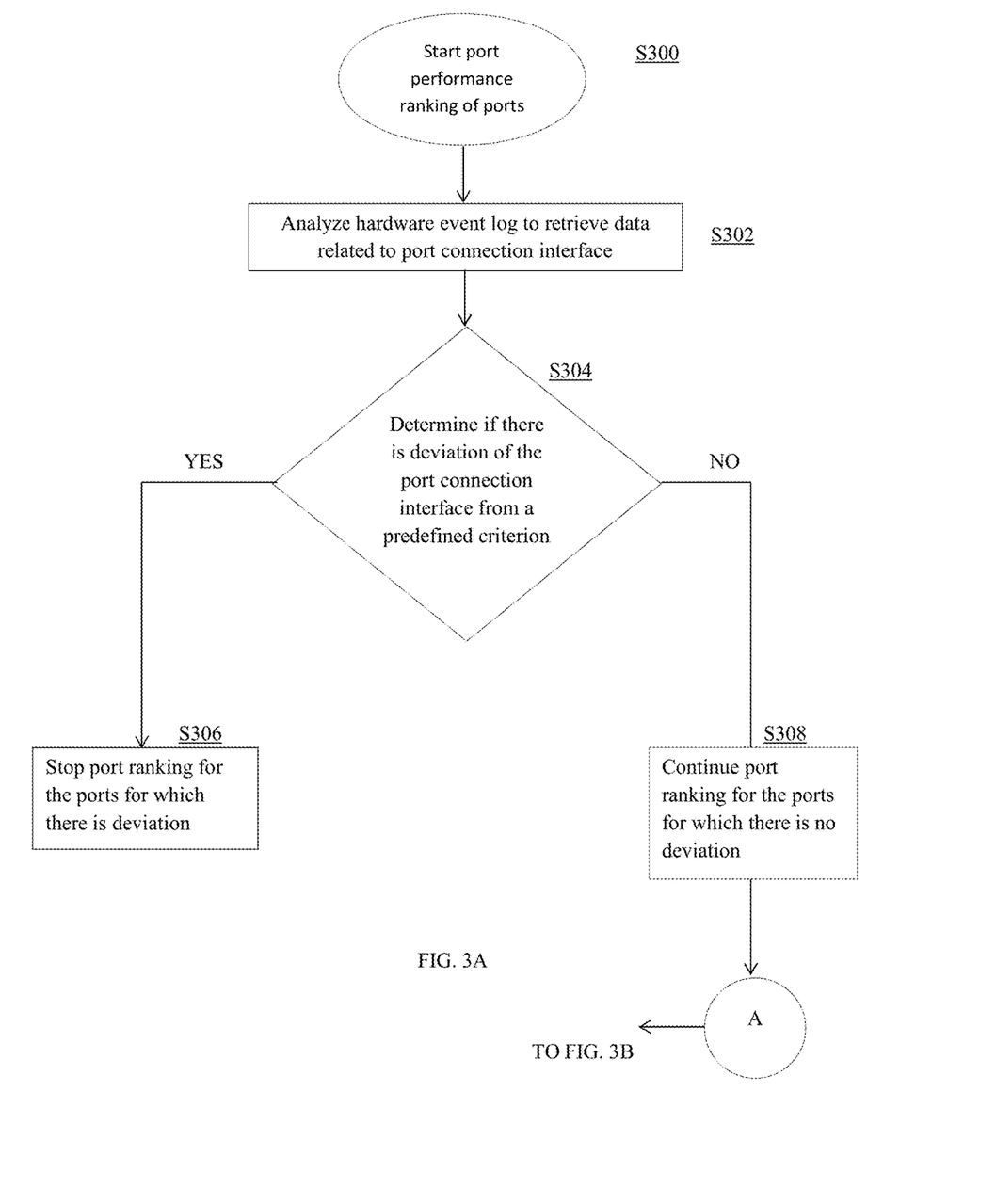
FIGS. 3A-3G illustrate a flowchart of exemplary method of port performance ranking performed by the multi-protocol switch in accordance with some embodiments.
Figure 3B:
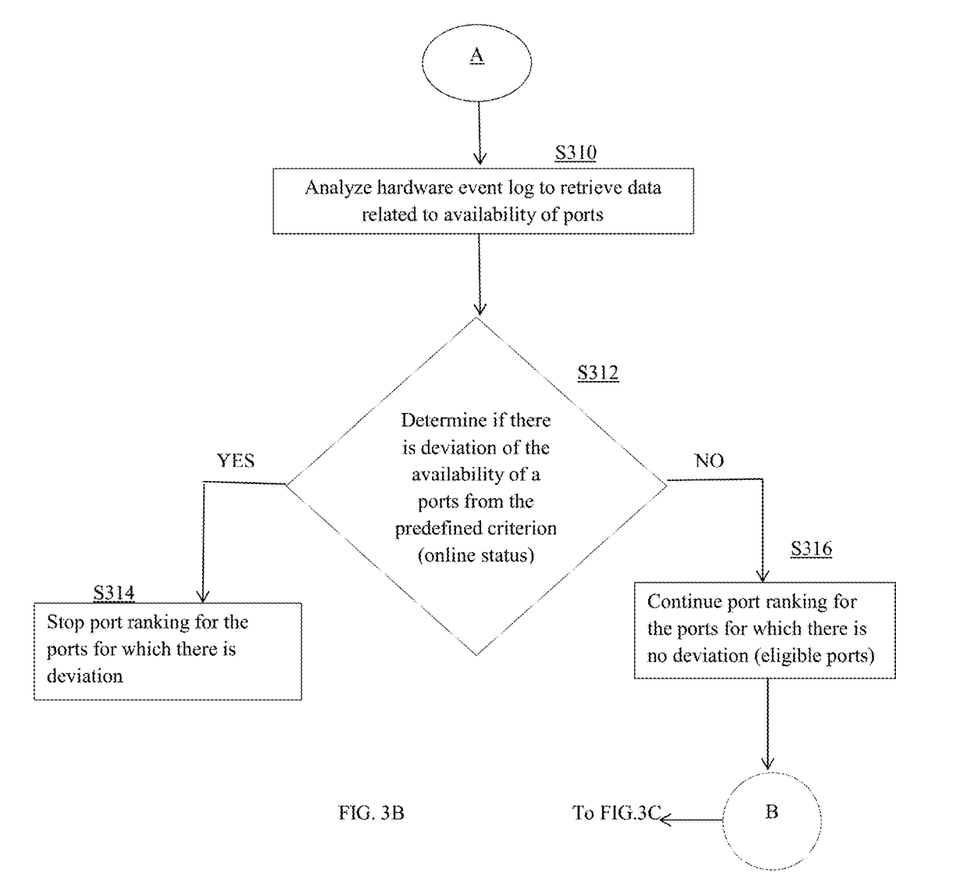
Figure 3C:
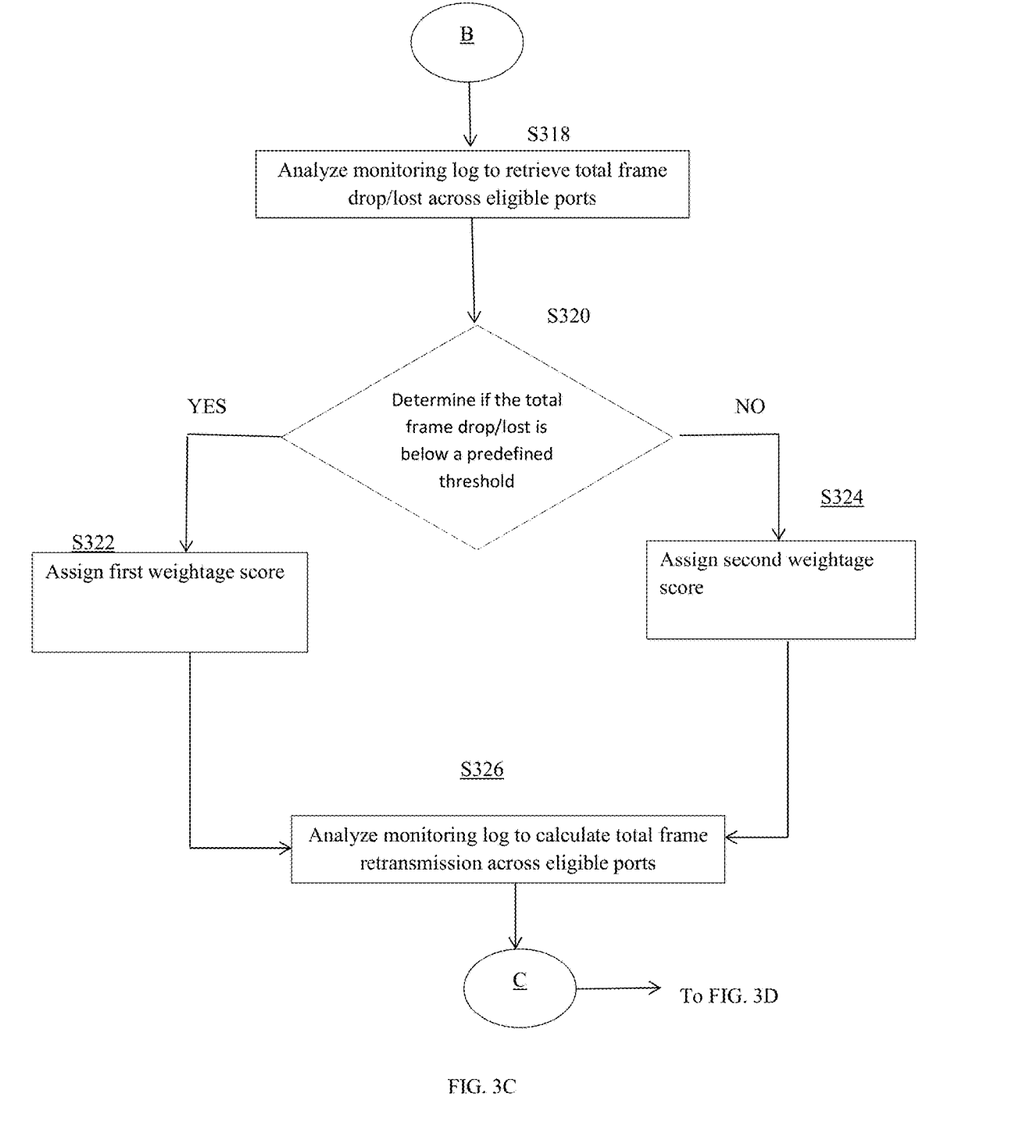
Figure 3D:
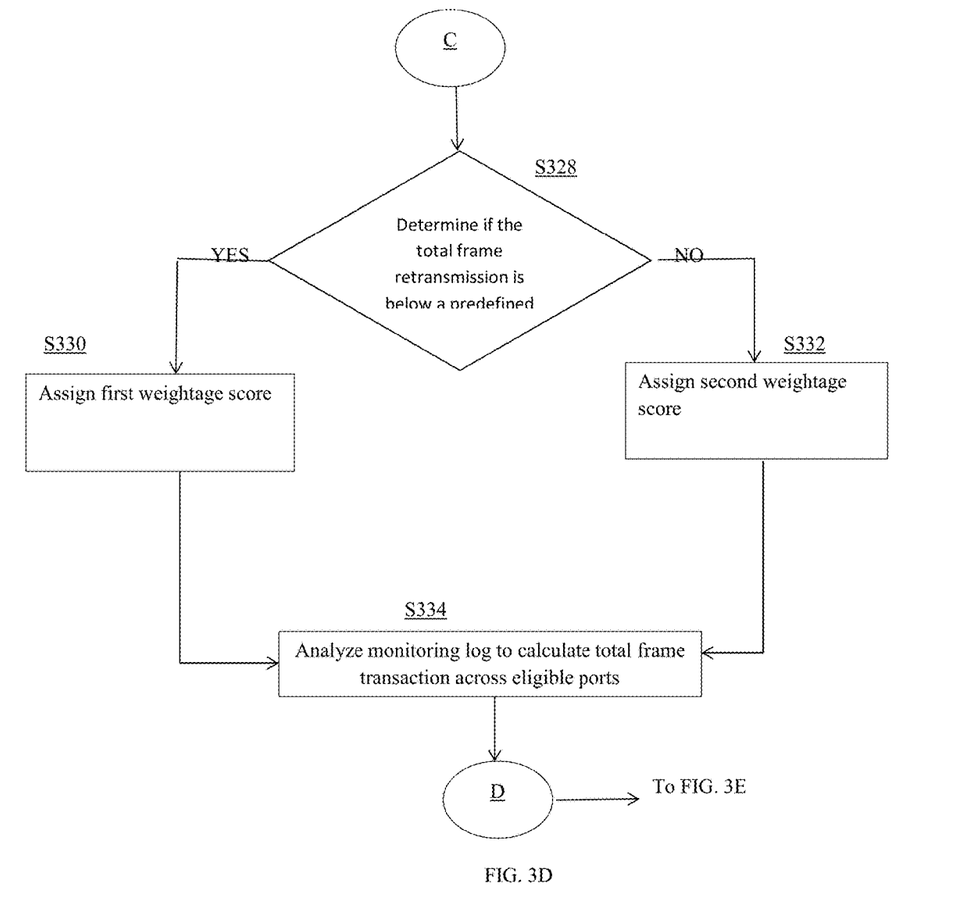
Figure 3E:
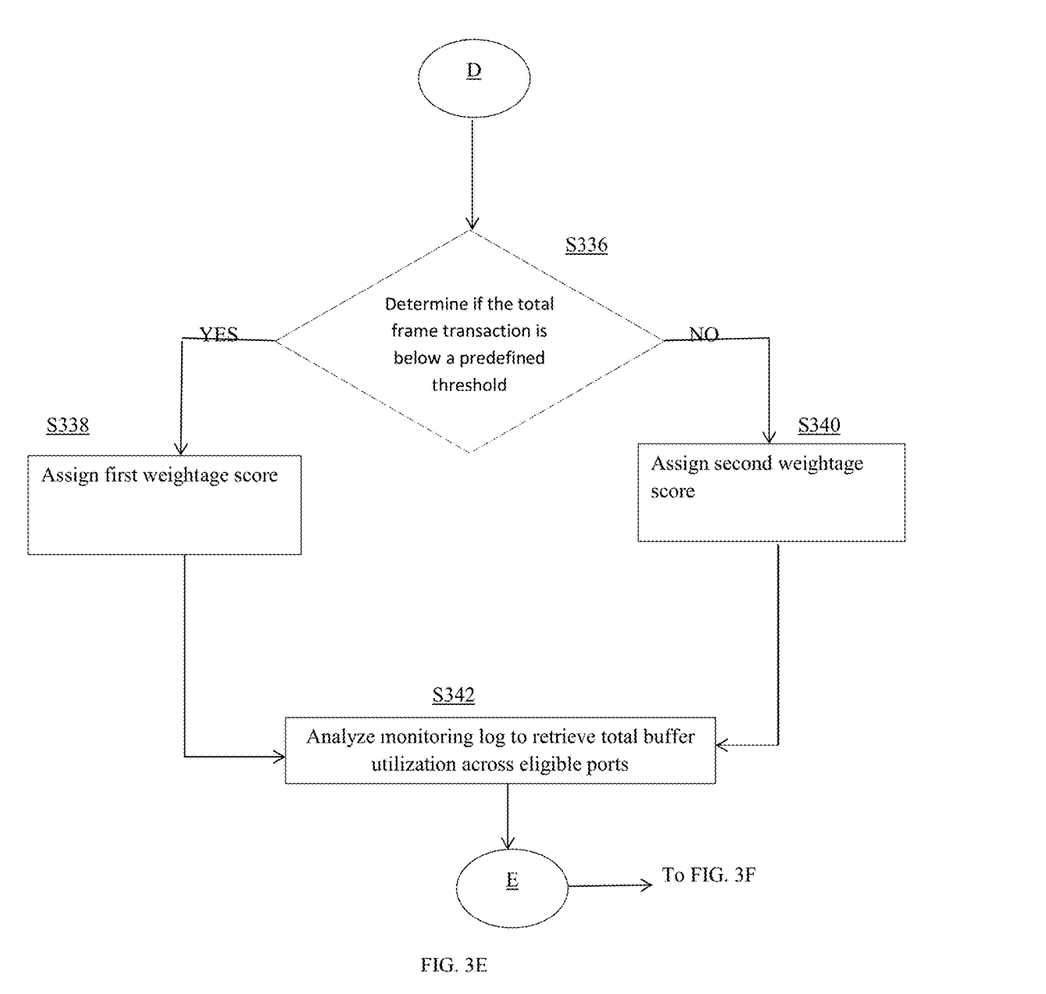
Figure 3F:
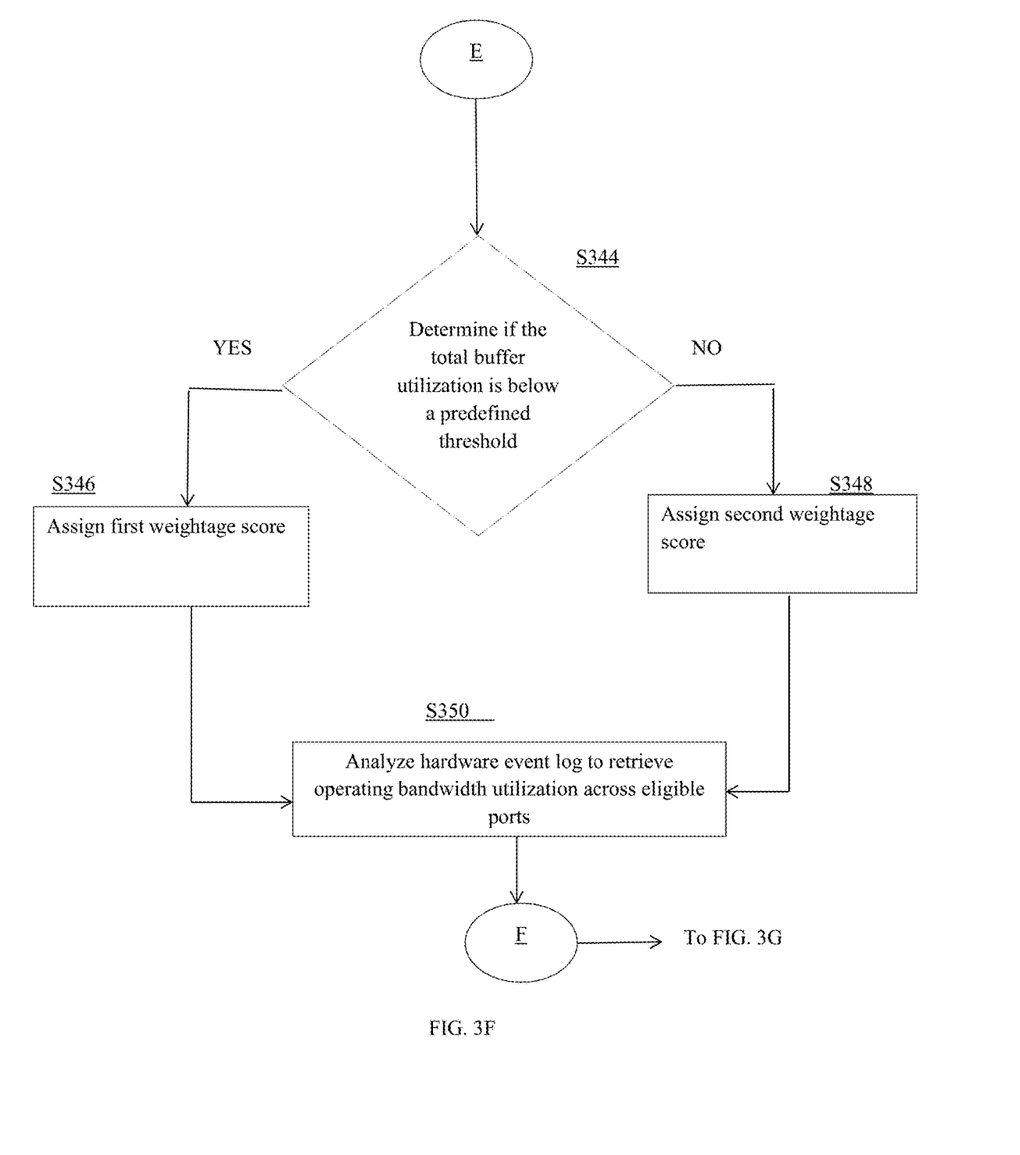
Figure 3G:
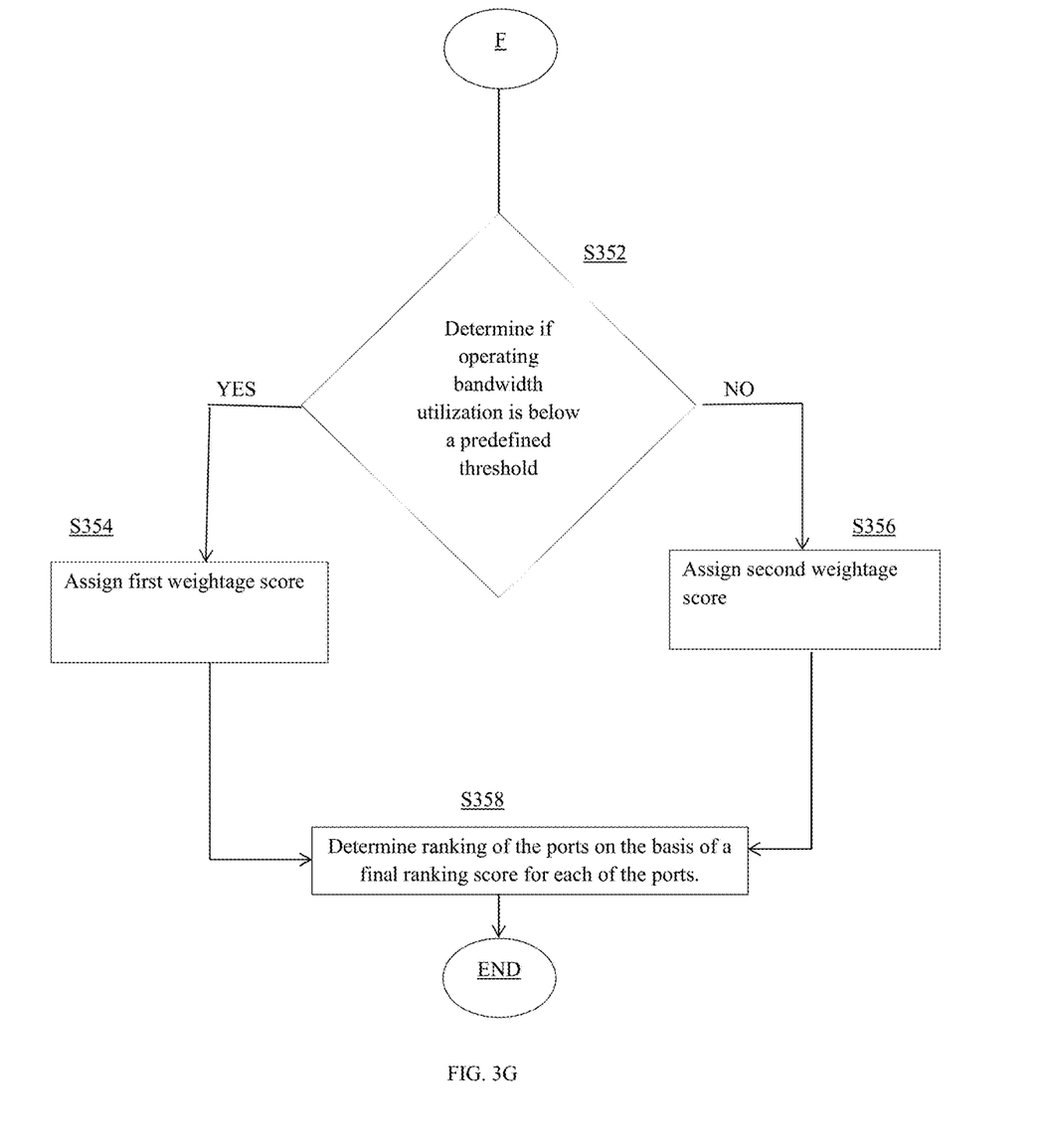

FIG. 2 is a block diagram illustrating the process of log collection by the multi-protocol switch device 110. A processor 120 and a memory 122 may be disposed in the multi-protocol switch device 110. It is the processor 120 that may actually perform process of log collection from the hardware event log 124, the I/O transaction log 126, and the monitoring log 128. The hardware event log 124, the I/O transaction log 126, and the monitoring log 128 may be stored in the memory 122. It should be apparent to a person skilled in the art that the logs are not limited to only the hardware event log 124, the I/O transaction log 126, and the monitoring log 128 but may include other logs.

The hardware event log 124 may comprise information of buffer utilization i.e. information of memory buffer utilization against the hardware event log 124, the I/O transaction log 126, and the monitoring log 128. The hardware event log 124 may poll health status of the internal component of the multi-protocol switch at definite time interval, for example the online/offline status of the ports. Further the host devices may be connected to the ports via connection interface. Different protocol may support connection interface through which the host devices are connected to the multi-protocol switch 110. These connection interfaces may be prone to error (disconnection, poor-quality connection, erroneous connection, etc.). These connection interfaces may be monitored by the processor 120 and data related to the connection interfaces may be maintained in the hardware event log 124.

I/O Transaction Log (IOTL) 126 may maintain the I/O frame tag id assigned by the processor 120. The response/acknowledgement/status from destination devices may use same outgoing and incoming frame tag id assigned by the processor 120 to its respective incoming frame/outgoing frame. The I/O transaction log 124 may maintain port traffic statistics in form of frame transactions against each frame tag id mentioned below:

Frame retransmission count against each frame tag ID
Frame drop/loss count against each frame tag ID
Frame transaction against each frame tag ID After collecting above mentioned data at IOTL, the processor 120 calculates total frame loss/drop against each port (IOFP), total frame transmission/transaction against each port (IOFP), total frame re-transmission against each port (IOFP). The data is stored at the monitoring log 126.

As noted above, the monitoring log 128 may provide information regarding the following:

Total frame loss/drop against each port (IOFP).
Total frame transmission/transaction against each port (IOFP).
Total frame re-transmission against each port (IOFP).
Information of operating bandwidth utilization of each port (IOFP)

Different protocol supported port operates at different bandwidth i.e. iSCSI operates at 10 gig per sec, FC operates at 16 gig per sec etc. The processor 120 tracks the utilization of frame bandwidth against protocol frame port. The processor continuously senses the frame port bandwidth utilization information and keeps it in monitoring log 128. The processor refreshes the frame port bandwidth utilization information at the monitoring log 128.

As noted above, the collection of logs regarding the operating condition of the ports and the port traffic statistics in the hardware event log 124, the I/O transaction log 126, and the monitoring log 128 may be effected by the processor 120. For the collection of logs regarding the port traffic statistics, tagging of the frame is an important step. The processor 120 may receive incoming frames at incoming ports from source devices (host devices). On receiving the incoming frames, the processor 120 may assign a frame tag id, which is a unique identification number of that incoming frame, to each of the incoming frames received from the host devices. The frame tag id may not be visible to external host devices connected to ports and may be used specifically by the processor 120 for internal frame identification purpose. The processor 120 then processes the frame and performs frame translation. The processor 120 may push translated frames (outgoing frames) to outgoing ports. Each of the outgoing frames may be assigned an identifier before reaching the destination devices (databases). The explanation of the incoming frame and the outgoing frame in the multi-protocol switch device 110 connected to source devices (host devices) and the destination devices (databases) is explained through the FIG. 5 block diagram.

Figure 5:
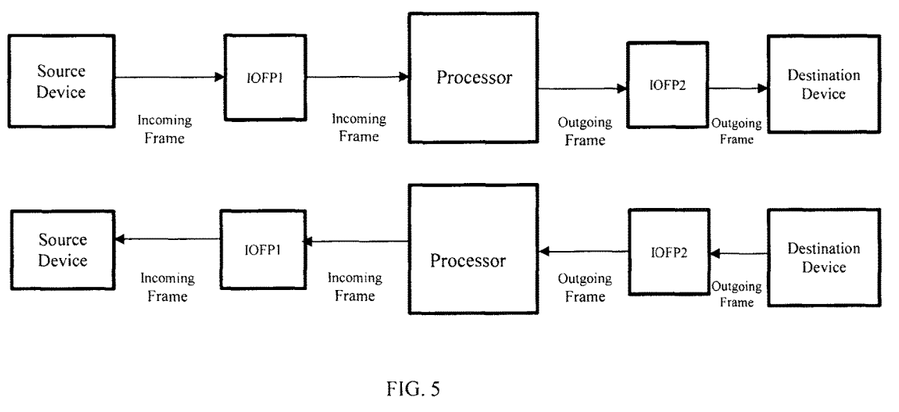
FIG. 5 is a block diagram illustrating the process of incoming frame and outgoing frame in the multi-protocol switch device.

As shown in the FIG. 5, when a frame is triggered from a source device (host devices) connected to multi-protocol supporting switch I/O port i.e. IOFP1, it may be referred as 'incoming frame'. From IOFP1 the frame may be passed to the processor 120. After internal frame processing, the processor 120 may pass the frame to multi-protocol supporting switch I/O port i.e. IOFP2, then it may be referred as 'Outgoing frame'. The frame may be delivered to destination device from IOFP2 and may be termed as 'Outgoing frame'. The identical process happens when response may be generated by destination device (databases). When a frame may be triggered from destination device connected to multi-protocol supporting switch I/O port i.e. IOFP2, it may be referred as 'Outgoing frame'. From IOFP2 the frame may be passed to the processor 120, the frame may be termed as 'Outgoing frame'. After frame translation, the processor 120 may pass the frame to I/O port i.e. IOFP1, then it may be referred as 'Incoming frame'. The frame may be delivered to source device via IOFP1 and may be termed as 'Incoming frame'.

FIGS. 3A-3G illustrate a flowchart of exemplary method of port performance ranking performed by the multi-protocol switch 110. At step S300, ranking of one or more ports start. At step S302, the hardware event log 124 may be analyzed by the processor 120 to retrieve data related to the port connection interface. The port connection interface may be associated with operating condition of the one or more ports. At step S304, the port connection interface may be compared against a predefined criterion to determine deviation. The predefined criterion may be error free connection interface. Therefore, deviation of the connection interface from the predefined criterion may include connection interface prone to error. If there is deviation of the connection interface of a subset of the one or more ports from the predefined criterion, port performance ranking for the subset of the one or more ports may stop (S306). On the other hand, if there is no deviation of the connection interface of subset of the one or more ports from the predefined criterion, the port performance ranking of the subset of the one or more ports may continue (S308).

At step S310, the hardware event log 126 may be again analyzed to retrieve the data related to availability of the ports.

The availability of the ports may pertain to online/offline status of the ports. In this case, the predefined criterion may be the online status of the ports. At step S312, the availability of the ports may be compared against a predefined criterion to determine deviation. Deviation from the predefined criterion may include offline status of ports. If there is deviation of the availability of a subset of the one or more ports from the predefined criterion, i.e. the subset of the one or more are offline, port performance ranking for the subset of the one or more ports may stop (S314). On the other hand, if there is no deviation of the availability of subset of the one or more ports from the predefined criterion, the port performance ranking of the ports may continue (S316). The ports for which there is no deviation from the predefined criteria for both the parameters may be referred to as eligible ports, i.e. the ports for which port performance ranking may be performed. It should be apparent to a person skilled in the art that the determination of eligible ports is not only based on the above two parameters but it may also be based on the other parameters also. Further, there are no weightage scores assigned against the port connection interface and the port status (online/offline). These parameters are used only to determine the eligibility of the ports for port ranking.

At step S318, the monitoring log is analyzed by the processor 120 to calculate total frame drop/lost across eligible ports. Further, at step S320, the total frame drop/lost for each of the eligible ports is compared against a predefined threshold and it is determined whether the total frame drop/lost for each of the eligible ports is within the predefined threshold or above the predefined threshold. The eligible ports for which the total frame drop/lost is within the predefined threshold, may be given a first weightage score (step S322). The eligible ports for which the total frame drop/lost is above the predefined threshold, may be given a second weightage score (step S324). The first weightage score may be higher than the second weightage score.

At step S326, the monitoring log is analyzed by the processor 120 to calculate total frame retransmission count for each of the eligible ports. Further, at step S328, the total frame retransmission count for each of the eligible ports is compared against a predefined threshold and it is determined whether the total frame retransmission count for each of the eligible ports is within the predefined threshold or above the predefined threshold. The eligible ports for which the total frame retransmission count is within the predefined threshold, may be given a first weightage score (S330). The eligible ports for which the total frame retransmission count is above the predefined threshold, may be given a second weightage score (S332). The first weightage score may be more than the second weightage score.

At step S334, the monitoring log is further analyzed by the processor 120 to calculate total frame transaction for each of the eligible ports. Further, at step S336, the total frame transaction for each of the eligible ports is compared against a predefined threshold and it is determined whether the total frame transaction for each of the eligible ports is within the predefined threshold or above the predefined threshold. The eligible ports for which the total frame transaction is within the predefined threshold, may be given a first weightage score (S338). The eligible ports for which the total frame transaction is above the predefined threshold, may be given a second weightage score (S340). The first weightage score may be more than the second weightage score.

At step S342, the monitoring log is further analyzed by the processor 120 to calculate buffer utilization associated with eligible ports. Further, at step S344, the buffer utilization for each of the eligible ports is compared against a predefined threshold and it is determined whether the total buffer utilization for each of the eligible ports is within the predefined threshold or above the predefined threshold. The eligible ports for which the total buffer utilization is within the predefined threshold, may be given a first weightage score (S346). The eligible ports for which the total buffer utilization is above the predefined threshold, may be given a second weightage score (S348). The first weightage score may be more than the second weightage score.

At step S350, the monitoring log is further analyzed by the processor 120 to calculate operating bandwidth utilization for each of the eligible ports. Further, at step S352, the buffer utilization for each of the eligible ports is compared against a predefined threshold and it is determined whether the operating bandwidth utilization for each of the eligible ports is within the predefined threshold or above the predefined threshold. The eligible ports for which the operating bandwidth utilization is within the predefined threshold, may be given a first weightage score (S354). The ports for which the operating bandwidth utilization is above the predefined threshold, may be given a second weightage score (S356). The first weightage score may be more than the second weightage score.

After completing the above mentioned steps, the processor 120 may calculate a final ranking score for each of the eligible ports and rank the eligible ports based on the weightage scores given to the parameters like total frame drop/lost count, total frame retransmission count, total frame transaction, buffer utilization, and operating bandwidth utilization (S358). It should be apparent to a person skilled in the art that the parameters are not only limited to the above mentioned parameters and it may include other parameters associated with port traffic statistics.

In an exemplary embodiment, the final ranking score for each of the eligible ports is calculated by summing up the weightage scores given to the parameters. In an event of two or more eligible ports having same final ranking score, the two or more eligible ports may be assigned priority based on the total frame drop count, total frame retransmission count, total frame transaction count, total buffer utilization, and total operating bandwidth utilization in decreasing order. It should be apparent to a person skilled in the art that the order of the above parameters may change. Further, the total frame drop count, total frame retransmission count, total frame transaction count, total buffer utilization, and total operating bandwidth utilization may be within the predefined thresholds. Based on the final ranking score for each of the eligible ports, a database is updated with best performing port. This process of determination of the final ranking score for each of the eligible ports is performed iteratively and if there is a change in the best performing port, the database is updated in response to the change.

Figure 6:
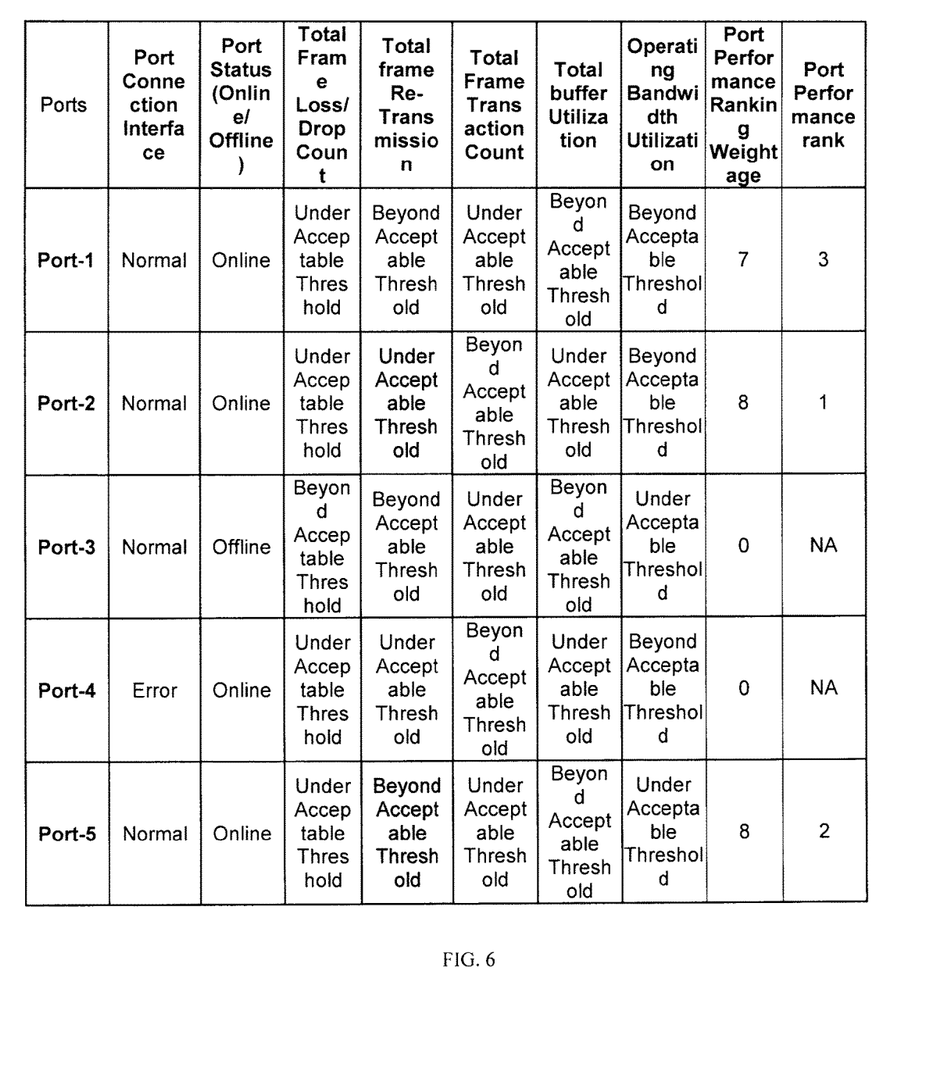
FIG. 6 illustrates a table of exemplary method of determination of eligibility of ports and ranking of the ports.

In an exemplary embodiment, the method of determination of the eligibility of the ports and ranking of the ports is explained with the help of FIG. 6 table.

In the FIG. 6 table, ranking of the ports on basis of the performance of the ports is being determined. The performance of the ports is based on various parameters like port connection interface, port status (online/offline), total frame loss, total frame retransmission count, total frame transaction count, total buffer utilization, operating bandwidth utilization. On the basis of the FIG. 6 table, following observation may be made.

If Port connection interface is "Error", port ranking determination of that port will not be done.
If Port status is "Offline", port ranking determination of that port will not be done.
There is no weightage point assigned against "Port Connection Interface" and "Port Status".
Under Acceptable Threshold weightage point is assigned as "2".
Beyond Acceptable Threshold weightage point is assigned as "1".

If any conflict occurs between Port performance ranking Weightage:
Check for "Total Frame Loss/Drop Count" parameter. If any of the conflicting port is performing "Under Acceptable Threshold", that will be determined as high performing port.
If conflict still exists, check for "Total frame Re-Transmission" parameter. If any of the conflicting port is performing "Under Acceptable Threshold", that will be determined as next high performing port.
If conflict still exists, check for "Total Frame Transaction Count" parameter. If any of the conflicting port is performing "Under Acceptable Threshold", that will be determined as next high performing port.
If conflict still exists, check for "Total buffer Utilization" parameter. If the any of the conflicting port is performing "Under Acceptable Threshold", that will be determined as next high performing port.
If conflict still exists, check for "Operating Bandwidth Utilization" parameter. If the any of the conflicting port is performing "Under Acceptable Threshold", that will be determined as next high performing port.

It should be apparent to a person skilled in the art that in determining the high performing ports, the priority order of the above mentioned parameters may change.

This disclosure provides a number of advantages including, without limitation, methods, non-transitory computer readable media, apparatuses, and systems that enable ranking of ports on the basis of port performance. The port performance is manifested in the form of a final ranking score for each of the ports. The final ranking score is calculated on the basis of the weightage scores given to various parameters. Based on the final ranking score, best performing port is determined. Next best performing port is determined. Consequently, ranking of the ports on the basis of the performance is performed. This has the advantage of easing the congestion on other ports of the multi-protocol switching device and smooth carrying out of I/O operations through the high performing ports.

Computer System

Figure 4:
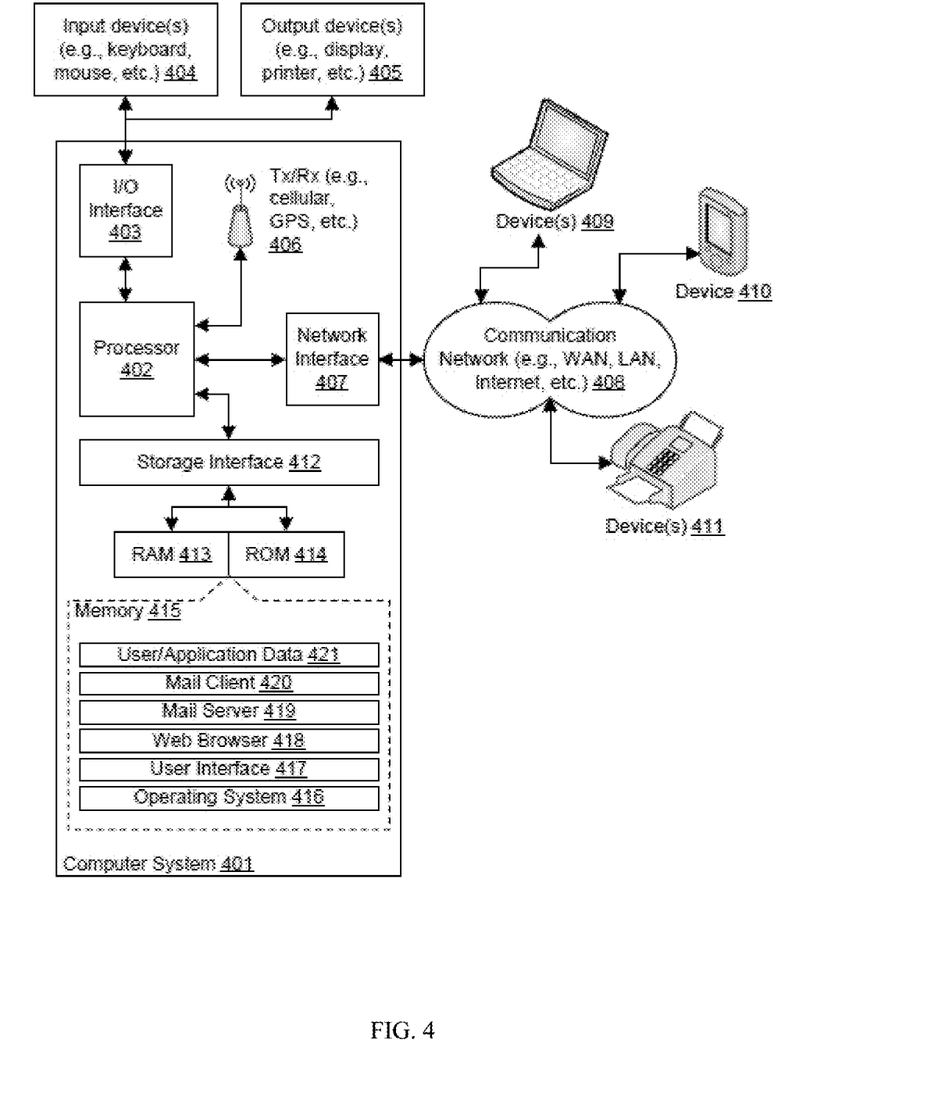
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing any of the devices presented in this disclosure. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and a system for determining port performance ranking in the multi-protocol switch. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed:

1. A method for analyzing port performance to improve multi-protocol switching in a storage area network (SAN), the method comprising:
   monitoring by a multi-protocol switch device, one or more first parameters associated with one or more operating conditions of each of a plurality of ports;
   comparing, by the multi-protocol switch device, each of the one or more first parameters with an associated predefined criterion to determine when one or more of the one or more first parameters deviates from the associated predefined criterion;
   identifying, by the multi-protocol switch device, a plurality of eligible ports of the plurality of ports for which the one or more first parameters are determined not to deviate from the associated predefined criterion;
   comparing, by the multi-protocol switch device and for each of the plurality of eligible ports of the plurality of ports, each of a plurality of second parameters with an associated predefined threshold, the plurality of second parameters associated with stored port traffic statistical data;
   generating, by the multi-protocol switch device, a weightage score for each of the plurality of second parameters for each of the plurality of eligible ports of the plurality of ports based on the comparison between each of the plurality of second parameters and the associated predefined threshold;
   determining, by the multi-protocol switch device, a ranking score for each of the plurality of eligible ports of the plurality of ports based on the weightage score for each of the plurality of second parameters for each of the plurality of eligible ports of the plurality of ports; and
   processing, by the multi-protocol switch device, one or more received input/output (I/O) operations in an order based on the ranking score for each of the plurality of eligible ports of the plurality of ports.

2. The method of claim 1, wherein the one or more operating conditions comprise an operating condition of a connection interface or an availability of the plurality of ports.

3. The method of claim 1, wherein the plurality of second parameters comprise at least one of a total frame drop count, total frame retransmission count, total frame transaction count, total buffer utilization, or total operating bandwidth utilization for each of the plurality of eligible ports of the plurality of ports.

4. The method of claim 1, wherein one or more of the plurality of second parameters exceeding the associated predefined threshold are assigned a different one of the plurality of weightage scores than another one or more of the plurality of second parameters not exceeding the associated predefined threshold.

5. The method of claim 1, wherein a best performing one of the plurality of eligible ports of the plurality of ports is determined based on at least one of the ranking score for each of the eligible ports of the plurality of ports or a predefined prioritized order associated with the plurality of second parameters and the one or more of the plurality of weightage scores for each of the plurality of second parameters.

6. A multi-protocol switch device, comprising:
   at least one processor;
   a plurality of ports; and
   at least one memory coupled to the processor, the memory storing processor executable instructions which when executed by the processor causes the processor to:
   monitor one or more first parameters associated with one or more operating conditions of each of the plurality of ports;
   compare each of the one or more first parameters with an associated predefined criterion to determine when one or more of the one or more first parameters deviates from the associated predefined criterion;
   identify a plurality of eligible ports of the plurality of ports for which the one or more first parameters are determined not to deviate from the associated predefined criterion;
   compare, for each of the plurality of eligible ports of the plurality of ports, each of a plurality of second parameters with an associated predefined threshold, the plurality of second parameters associated with stored port traffic statistical data;
   generate a weightage score for each of the plurality of second parameters for each of the plurality of ports based on the comparison between each of the plurality of second parameters and the associated predefined threshold;

determine a ranking score for each of the plurality of eligible ports of the plurality of ports based on the weightage score for each of the plurality of second parameters for each of the plurality of eligible ports of the plurality of ports; and process one or more received input/output (I/O) operations in an order based on the ranking score for each of the plurality of eligible ports of the plurality of ports.

7. The device of claim 6, wherein the one or more operating conditions comprise an operating condition of a connection interface or an availability of the plurality of ports.

8. The device of claim 6, wherein the plurality of second parameters comprise at least one of a total frame drop count, total frame retransmission count, total frame transaction count, total buffer utilization, or total operating bandwidth utilization for each of the plurality of eligible ports of the plurality of ports.

9. The device of claim 6, wherein one or more of the plurality of second parameters exceeding the associated predefined threshold are assigned a different one of the plurality of weightage scores than another one or more of the plurality of second parameters not exceeding the associated predefined threshold.

10. The device of claim 6, wherein a best performing one of the plurality of eligible ports of the plurality of ports is determined based on at least one of the final ranking score for each of the eligible ports of the plurality of ports or a predefined prioritized order associated with the plurality of second parameters and the one or more of the plurality of weightage scores for each of the plurality of second parameters.

11. A non-transitory computer readable medium having stored thereon instructions for analyzing port performance to improve multi-protocol switching in a storage area network (SAN) comprising executable code which when executed by one or more processors, causes the processors to:

monitor one or more first parameters associated with one or more operating conditions of each of the plurality of ports;

compare each of the one or more first parameters with an associated predefined criterion to determine when one or more of the one or more first parameters deviates from the associated predefined criterion;

identify a plurality of eligible ports of the plurality of ports for which the one or more first parameters are determined not to deviate from the associated predefined criterion;

compare, for each of the plurality of eligible ports of the plurality of ports, each of a plurality of second parameters with an associated predefined threshold, the plurality of second parameters associated with stored port traffic statistical data;

generate a weightage score for each of the plurality of second parameters for each of the plurality of eligible ports of the plurality of ports based on the comparison between each of the plurality of second parameters and the associated predefined threshold;

determine a ranking score for each of the plurality of eligible ports of the plurality of ports based on the weightage score for each of the plurality of second parameters for each of the plurality of eligible ports of the plurality of ports; and process one or more received input/output (I/O) operations in an order based on the ranking score for each of the plurality of eligible ports of the plurality of ports.

12. The non-transitory computer readable medium of claim 11, wherein the one or more operating conditions comprise an operating condition of a connection interface or an availability of the plurality of ports.

13. The non-transitory computer readable medium of claim 11, wherein the plurality of second parameters comprise at least one of a total frame drop count, total frame retransmission count, total frame transaction count, total buffer utilization, or total operating bandwidth utilization for each of the plurality of eligible ports of the plurality of ports.

14. The non-transitory computer readable medium of claim 11, wherein one or more of the plurality of second parameters exceeding the associated predefined threshold are assigned a different one of the plurality of weightage scores than another one or more of the plurality of second parameters not exceeding the associated predefined threshold.

15. The non-transitory computer readable medium of claim 11, wherein a best performing one of the plurality of eligible ports of the plurality of ports is determined based on at least one of the ranking score for each of the eligible ports of the plurality of ports or a predefined prioritized order associated with the plurality of second parameters and the one or more of the plurality of weightage scores for each of the plurality of second parameters.

* * * * *